United States Patent
Wilkinson (10) Patent No.: US 10,224,740 B2
(45) Date of Patent: *Mar. 5, 2019

(54) WIRELESS BATTERY RECHARGER AND APPLICATION

(71) Applicant: Christopher Wilkinson, Brooklyn, NY (US)

(72) Inventor: Christopher Wilkinson, Brooklyn, NY (US)

(73) Assignee: Christopher Wilkinson, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/951,389

(22) Filed: Apr. 12, 2018

(65) Prior Publication Data

US 2018/0233945 A1    Aug. 16, 2018

Related U.S. Application Data

(63) Continuation of application No. 15/392,510, filed on Dec. 28, 2016, now Pat. No. 9,960,635.

(60) Provisional application No. 62/272,169, filed on Dec. 29, 2015.

(51) Int. Cl.
| | |
|---|---|
| H04M 1/00 | (2006.01) |
| H02J 7/35 | (2006.01) |
| G06F 1/26 | (2006.01) |
| G06F 1/16 | (2006.01) |

(52) U.S. Cl.
CPC ............ *H02J 7/355* (2013.01); *G06F 1/1635* (2013.01); *G06F 1/26* (2013.01)

(58) Field of Classification Search
CPC .. H02J 7/355; H02J 3/385; G06F 1/26; G06F 1/1635; H02S 40/38; F24S 25/10; H01M 10/623

See application file for complete search history.

(56) References Cited

U.S. PATENT DOCUMENTS

| | | | |
|---|---|---|---|
| 9,960,635 B2 * | 5/2018 | Wilkinson | G06F 1/26 |
| 2003/0171092 A1 | 9/2003 | Karamanos | |
| 2009/0098832 A1 * | 4/2009 | Johnson | H04B 1/1607 455/73 |

(Continued)

OTHER PUBLICATIONS

International Search Report and Written Opinion dated Mar. 16, 2017 in corresponding PCT international patent application No. PCT/US2016/069082.

*Primary Examiner* — Nhan T Le (74) *Attorney, Agent, or Firm* — Gearhart Law LLC (57) ABSTRACT

A system for recharging a battery having; memory that stores computer-executable instructions; a processor, communicatively coupled to the memory that facilitates execution of the computer-executable instructions; the instructions having: a battery; a thermal insulating layer; the thermal insulating layer; adapted and configured as the exterior of the battery; the battery adapted and configured with the thermal insulation layer for harnessing heat created by a plurality of solar panels; the plurality of solar panels configured on the exterior of the battery; an application interface unit; the application interface unit adapted and configured to control the plurality of solar panels; wherein the processor transforms heat energy collected by the plurality of solar panels and stored in the thermal insulation layer into energy to power a communication device.

16 Claims, 4 Drawing Sheets

(56) References Cited

U.S. PATENT DOCUMENTS

| | | |
|---|---|---|
| 2011/0193517 A1 | 8/2011 | Sander et al. |
| 2013/0178992 A1 | 7/2013 | De Graeve et al. |
| 2013/0200811 A1 | 8/2013 | Steininger et al. |
| 2014/0159637 A1 | 6/2014 | Ebersold |
| 2015/0115867 A1* | 4/2015 | Chang .................. H02J 7/355 |
| | | 320/101 |

* cited by examiner

WIRELESS BATTERY RECHARGER AND APPLICATION

CLAIM OF PRIORITY

This application claims priority to U.S. patent Publication Ser. No. 15/392,510, filed on Dec. 28, 2016, which claims priority to U.S. Ser. No. 62/272,169 filed on Dec. 29, 2015. The contents of both are fully incorporated herein by reference.

FIELD OF THE EMBODIMENTS

The invention and its embodiments relate to a system, method and device for recharging a battery wirelessly and remotely.

BACKGROUND OF THE EMBODIMENTS

Wireless charging is an appealing technology because it allows you to charge your smartphone without the use of Universal Serial Bus (USB) plugs. Just place the smartphone on a wireless charger and it will start charging. Of course, the wireless charger itself must still be plugged into the wall. Wireless charging is more accurately described as "inductive charging" because it uses magnetic induction. The short explanation is that it uses magnetism to transmit energy. The current coming from the wall power outlet moves through the wire in the wireless charger, creating a magnetic field. The magnetic field creates a current in the coil inside the device. This coil is connected to the battery and the current charges the battery. Devices must have the appropriate hardware in them to support wireless charging—a device without the appropriate coil can't charge wirelessly.

Wireless chargers emit an alternating current via a transmitter coil, which then induces a voltage in the receiver coil found in the device. Qi (pronounced "chee") wireless charging pads are capable of charging smartphones, tablets, Bluetooth® headsets, cameras and portable power packs. However, to wirelessly charge a mobile device, one requires a wireless charging pad. To date, a mobile device or smart phone cannot charge itself wirelessly. The current invention seeks to solve this problem.

The average life span of a cell phone battery is from 400 to 500 charge cycles. That means the average battery lasts from one to two years. A decrease in the duration of the battery's lifespan between charge cycles indicates that the battery should be replaced. Lithium ion batteries usually maintain their full capacity for most of their lifetimes, and then die suddenly. Using a mobile device or smart phone frequently means battery power must be optimized and maximized. A use of a mobile device or other computing device can maximize battery power by limiting the number of charges. Charging a phone when it is at half power, as opposed to a phone with depleted power, trains a battery to hold only half of a charge. If possible, one should only charge the phone when its power has been completely depleted. Thus, there is a need for a battery that can maximize the amount of time one can use a device without having to consistently be charging the battery.

The two most common types of mobile device batteries are nickel cadmium (NiCd) and lithium ion (Li-ION) batteries. Nickel cadmium batteries are low maintenance batteries with a high performance rate, which means they can sustain normal power until the battery is nearly exhausted. Lithium ion batteries have twice the energy of nickel cadmium batteries, and they are 33 percent lighter. The main difference between lithium and lithium ion batteries is that lithium batteries are a primary cell and lithium ion batteries are secondary cells. The term primary cell refers to cells that must be discarded after one use. Secondary cell is a term that refers to a battery's ability to be recharged. Thus lithium ion batteries are most attractive to mobile devices as well as other computing devices. Lithium ion batteries can be charged several times before becoming ineffective. Lithium ion batteries use a number of other materials to form their anode. The success of a battery also depends on the temperature of the battery. Extreme temperatures may hurt battery life. This includes extreme hot or extreme cold. Thus, there is a need for a battery, that affected by temperature in a positive way, and that can be charged wirelessly and with longevity.

Review of Related Technology

U.S. Pat. No. 8,350,520 teaches a system and method for a self-charging battery cell in which beta emissions from a Strontium-90 source are obtained by a sensor device and converted into electric energy. In embodiments, a scintillation device is used to intake emissions from a Strontium-90 source, and consequently emit a light or plurality of light flashes. A sensor device, e.g., a photodiode, is utilized to convert the light or plurality of light flashes into electric voltage, current and/or energy.

U.S. Pat. No. 7,910,235 discloses a lithium battery which includes a lithium battery body, and a generating device; the generating device is fitted on one side of the lithium battery body, and it includes a motive power mechanism, and a magnetic line of force cutting mechanism; the magnetic line of force cutting mechanism is connected to wires connected to inside of the lithium battery body; the motive power mechanism has a magnetic element therein, which will move so as to cause the magnetic line of force cutting mechanism to produce an induced current to charge the lithium battery body the when the lithium battery is manually moved.

United States Patent Publication No. 20130227694 discloses a mobile device charging station configured to analyze, measure and respond to/correct the state of a mobile device. The charging station can employ an embedded cryptographic subsystem that can make use of anti-tamper/tamper evident techniques to protect stored firmware images/cryptographic material.

International Patent Publication No. WO 2015027128 discloses a system for charging a personal electronic device ("PED"). The system includes a power storage module (or "portable power source") including a magnetic transfer module, a charging module, and a storage module. The power storage module wirelessly transfers power to the PED via a device interface module, to power a device charging module in the PED.

Chinese Patent No. CN103296721 teaches a mobile phone charging software which comprises a charging unit, a detecting unit and a protecting unit. The charging unit is used for charging an intelligent mobile phone and is connected with a mobile phone charging interface, the detecting unit comprises a current detecting subunit, a temperature detecting subunit and a voltage detecting subunit, the protecting unit comprises a power-off protecting subunit, and the detecting unit is connected with the charging unit and the protecting unit. The mobile phone charging software has the advantages that the safety degree of a battery charging procedure is increased, the charging efficiency is improved, a battery is protected in the charging procedure, and the service life of the battery is prolonged.

Chinese Patent No. CN 103296721 discloses a mobile phone charging software which comprises a charging unit, a detecting unit and a protecting unit. The charging unit is used for charging an intelligent mobile phone and is connected with a mobile phone charging interface, the detecting unit comprises a current detecting subunit, a temperature detecting subunit and a voltage detecting subunit, the protecting unit comprises a power-off protecting subunit, and the detecting unit is connected with the charging unit and the protecting unit. The mobile phone charging software has the advantages that the safety degree of a battery charging procedure is increased, the charging efficiency is improved, a battery is protected in the charging procedure, and the service life of the battery is prolonged.

United States Patent Publication No. 20130026982 teaches a battery charging device, method and system are disclosed for wirelessly charging a battery. A transmitter can transmit an RF wireless power signal to a battery charging device, and a receiver within the battery charging device can receive the RF wireless power signal. The battery charging device can thereafter transfer the received RF wireless power signal to a battery receiving portion to charge the battery. In an embodiment, the RF wireless power signal is transferred at a frequency of about 13.56 MHz to overcome wave shadowing. A battery recharging feedback control circuit can optionally be applied in combination with the battery charging device and can monitor a power quantity of the RF wireless power signal.

Various devices are known in the art. However, their structure and means of operation are substantially different from the present invention. Such devices fail to provide a device that is optimized for charging a battery through thermal heat energy captured by solar panels built into the device's battery. At least one embodiment of this invention is presented in the drawings below, and will be described in more detail herein.

SUMMARY OF THE EMBODIMENTS

The present invention provides a system for recharging a battery having; memory that stores computer-executable instructions; a processor, communicatively coupled to the memory that facilitates execution of the computer-executable instructions; said instructions having: a battery; a thermal insulating layer; said thermal insulating layer; adapted and configured as the exterior of the battery; said battery adapted and configured with the thermal insulation layer for harnessing heat created by a plurality of solar panels; said plurality of solar panels configured on the exterior of the battery; an application interface unit; said application interface unit adapted and configured to control the plurality of solar panels; wherein said processor transforms heat energy collected by the plurality of solar panels and stored in the thermal insulation layer into energy to power a communication device.

The system also has the feature wherein a user may adjust the communication devices power settings to operate on power derived from a wireless source. The wireless source may be a plurality of solar panels configured on the communication device. The thermal insulation layer is comprised of thermal coils and may be configured on the interior of the battery. The application interface unit may be encrypted. The thermal insulation layer may be configured external to the battery. The thermal insulation layer may surround the perimeter of the plurality of solar panels. The plurality of solar panels may be configured on the exterior of the communication device. The battery is further powered by a micro battery adapted and configured to be an internal component of the battery. The application interface unit is used to control the amount of stored heat. The battery may be adapted and configured for use in mobile devices, desk top computers or a plurality of devices which utilize battery power. The plurality of solar panels may be controlled by the application interface unit.

The present invention provides a method for recharging a battery, having memory that stores computer-executable instructions; said computer-executable instructions, a processor, communicatively coupled to the memory that facilitates execution of the computer-executable instructions; said instructions having, capturing, via the processor, solar heat power via a plurality of solar panels; said plurality of solar panels configured as the exterior of the battery; and wherein said processor transforms heat energy collected by the plurality of solar panels and stored in a thermal insulation layer into energy to power a communication device.

It is an object of the present invention that the battery is a lithium ion battery.

DESCRIPTION OF THE PREFERRED EMBODIMENTS

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 1:
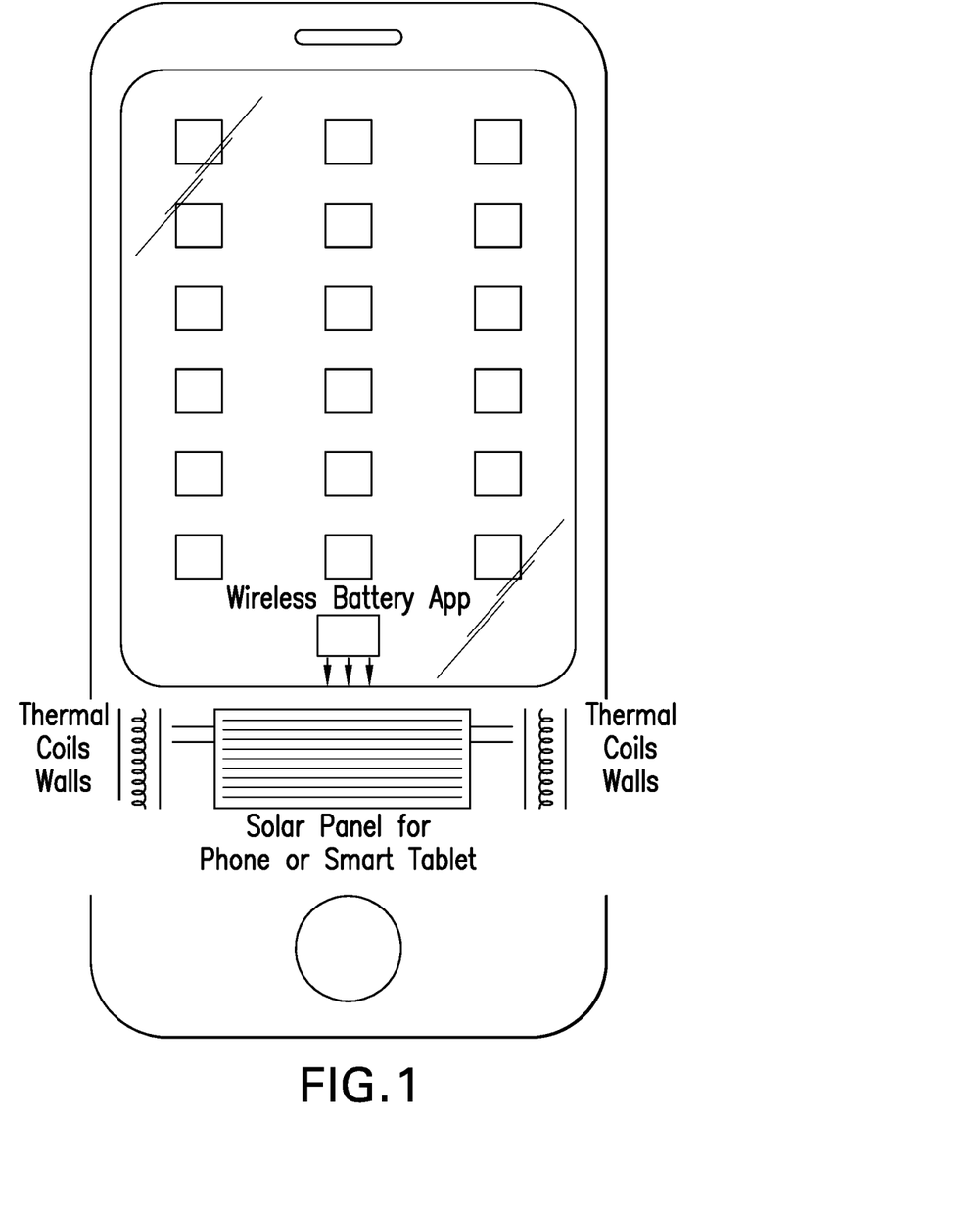
FIG. 1 shows an illustrative view of a front view of the present invention as part of a computing device.

FIG. 1 shows an illustrative view of a front view of the present invention as part of a computing device. FIG. 1 shows the computing device having a solar panel component wherein heat from the sun is captured, stored and converted into power to charge the mobile devices battery power. The battery also comprises a plurality of thermal coil walls that store any heat captured by the solar panels and save such heat energy for later use when the battery of the phone is not fully powered or in need of a charge. FIG. 1 also shows the wireless battery application that is present on a user's mobile device for a user to control.

The device solar charging system uses a charge controller. The charge controller takes energy from solar panels and converts the voltage to a level that is suitable to charge the battery of the mobile or computing device. The charge controller which is controlled by the downloadable software present on a user's mobile or computing device, will automatically disconnect the battery from the solar panel once the device's battery is fully charged. The charge controller may also contain a maximum power point tracking (MPPT) circuit which will maximize the energy from the solar panel. The charge controller is able to accommodate more than the peak amount of current from the solar panel. In a preferred embodiment, multiple solar panels are used in the device or as part of the battery of the device. The device, via the charge controller are able to receive the total amount of current from all of the solar cells put together.

In the event of a diminishing light source, the charge controller simply turns off and resumes when sufficient levels of light are restored. The charge controller tracks the power by continually measuring the voltage to dynamically adjust the current. It enables maximum power transfer with available light conditions, and this is made possible with maximum power point tracking (MPPT).

Figure 2:
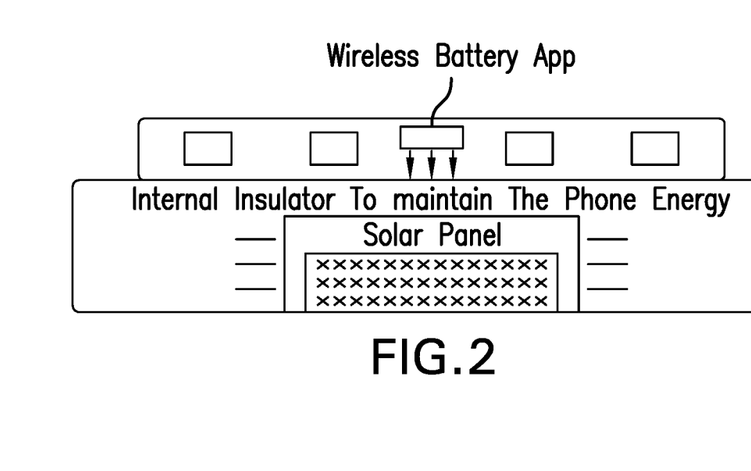
FIG. 2 shows an illustrative view of an interior view of the present invention as part of a computing device.

FIG. 2 shows the device having an internal insulator such that any heat energy created by the solar panels and amplified by the thermal coils may be stored by the internal insulator to ensure maximum usage of the created heat energy to power the computing or mobile device. The internal insulators may be disposed around the thermal coils or alternatively around the solar panels. In another embodiment, the insulator, thermal coils and solar panels are all connected to the device's battery and are individual components. In another embodiment, such components are integral to the battery and/or the computing or mobile device. The application on the computing device may control the solar panels power and strength. The application may also control the amount of heat energy to be released that is stored in the thermal coils. The application also displays the amount of thermal heat energy that is needed to charge the battery as well as how much power is left in the battery.

Figure 3:
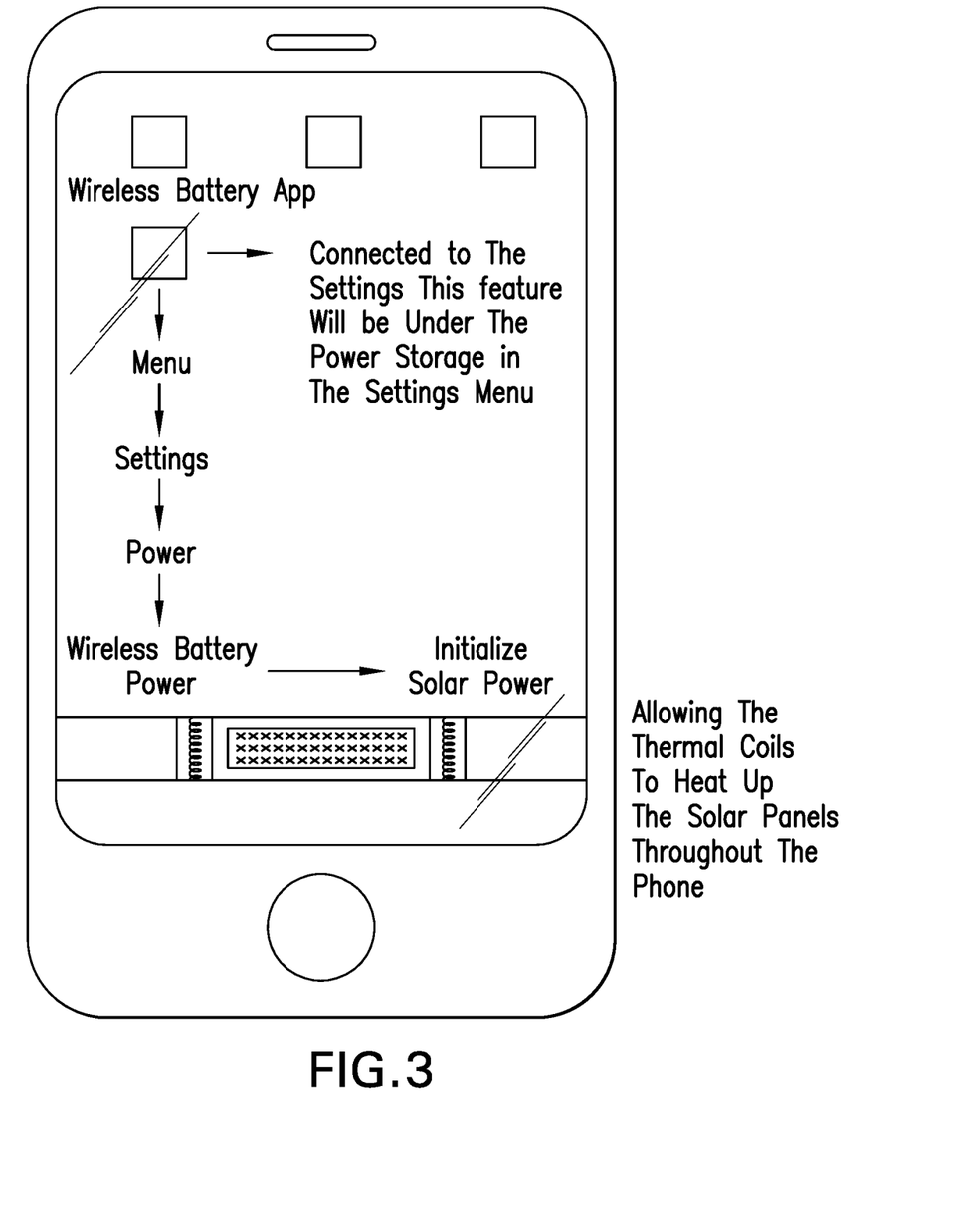
FIG. 3 shows an alternative view of an interior front view of the present invention as part of a computing device.
Figure 4:
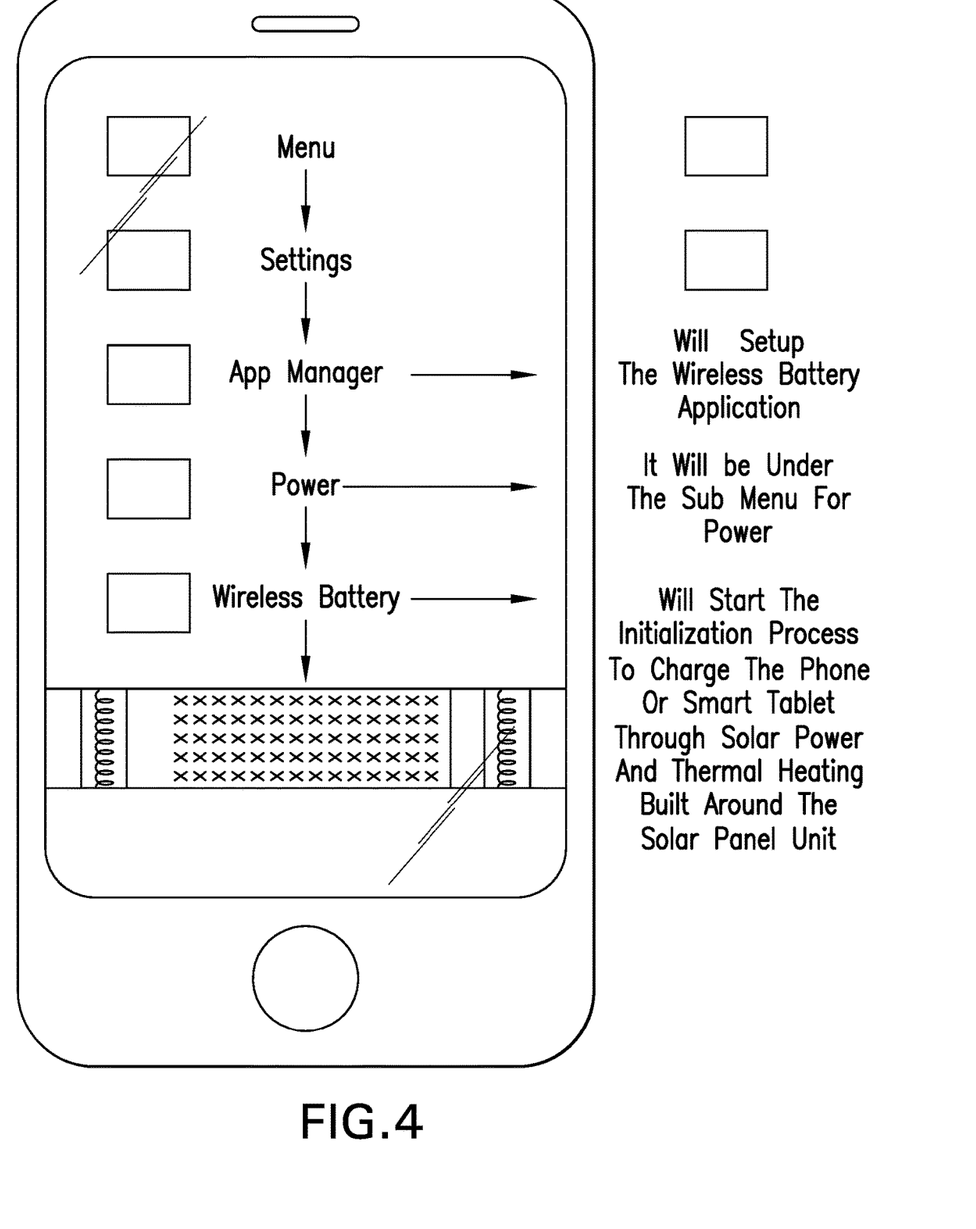
FIG. 4 shows an alternative view of an interior front view of the present invention as part of a computing device.

FIG. 3 shows an illustrative and representative view of the application software that a user can download to control the battery and the solar panels. The software may be also be part of the mobile or computing device's operating system. As shown in FIG. 3 a user may select to initialize the solar panel's activity by choosing the menu function, the settings function, and then the power function. Under the power function setting, a user may then choose to power their phone by using stored battery power or may choose to initiate the solar panels to capture additional thermal heat energy and thus replenish the batter power. Once the solar panel power is initiated and solar power is captured the battery's solar panel the captured thermal heat energy may then be further heated up. This heat energy can then replenish the battery power or power the battery of the device. The insulator coils ensure that any captured heat energy is used to its maximum efficiency. FIG. 4 shows an alternative view of the wireless battery application software. In FIG. 4, a user can view a graphical representation of stored solar power, used solar power, stored battery power, used battery power as well as other features relating to the process.

The present invention teaches an internal rechargeable battery for mobile devices and smart tablets. A desktop or mobile application that may be downloaded into a smartphone, tablet and other mobile devices which will charge the internal battery within these devices, thereby eliminating the need for any external battery charger wirelessly connected to a plug and electrical outlet. The present invention teaches a customized software application to charge the built-in internal battery which can be accessed and used from any connected or unconnected mobile device, smartphone, android, or tablet. The present invention teaches a battery which can continuously be charged to power the mobile e or computing device it is attached to.

The present invention's application may enable a user to keep track of the mobile devices battery power. This may include allowing a user to visually view how much battery power is left on the internal battery. Should the battery be low in power or reducing in power, a user may through the present inventions application be able to initiate the use of power which has been stored and reserved by the thermal coils which are connected to the internal battery. Any power used in reserve is replenished by the external solar panels which are connected to the thermal coils and internal battery.

The software may have an anti-virus program as well as an encryption feature within the application to protect the battery's charging process and life span from any potential hackers that would try to deprogram the battery capabilities within these mobiles devices. The application may comprise a built in internal solar power feature combined with stored light to keep the battery charged internally without the dependency of electricity or sunlight. In another embodiment, the device may comprise a micro battery powered generator to recharge the battery that can also be downloaded from the smartphone, android or smart tablet from the desktop application.

In another embodiment, the solar powered wireless battery may be controlled and powered by a desktop application which may automatically charge the battery internally. The present invention does not require any external components to charge the battery. The present invention may contain at least one solar panel that may or may not be integral to the battery of the computing or mobile device.

The present invention may include a microchip built into the wireless battery which would be activated by the corresponding application. The application would control the charging process of the mobile device or other computing device to charge the battery power internally without the need for wired power. The application may also be configured with an interactive diagnostic feature to troubleshoot the wireless battery's functionalities. The present inventions wireless battery will be configured with a power saving feature that enables a user to save battery power to act as a backup generator should mobile device or computing devices battery requires additional power to be generated.

The present inventions wireless battery is configured to store energy via energy collected by the solar panels configured around the perimeter of the wireless battery. Such solar panels may collect solar energy as a standalone feature or when the battery is being used as part of the external walls of the computing device or the mobile device. When the wireless battery's solar panels are being used as part of a computing devices or mobile devices external components, then the corresponding application may control the solar panels. For example the application can activate the solar panels and a user can control the amount and strength of stored energy to be transferred from the solar panels to the wireless battery and to the computing or mobile device. The application can display to a user how much power is left on the battery as well as how much battery power is needed to power the computing or mobile device. The application will also be configured with a diagnostic tool for Trouble shooting power and battery issues of the computing and mobile device.

The present invention solves the issue facing smart phone, tablet and mobile devices today, battery power and strength. The more unlimited battery power available to users the better especially power that can be created without having to use an electrical outlet or external charging devices. The present invention is configured of a wireless battery, preferably a lithium ion battery which has an exterior wall comprised of a solar energy panel or plurality of solar energy panels. The wireless battery may then be configured as part of the internal components of the computing or mobile device while the solar panels are configured as the external components of such a device. Thus, any solar energy captured by the solar panels would be stored and then later used as energy for the attached computing and mobile device. Such transfer of stored energy may be controlled by a downloadable application on the corresponding computing or mobile device. The wireless battery of the present invention will be configured with thermal insulation around the solar panels so that any stored heat energy may be maximized and used to power the computing or mobile device. The wireless battery will have universal capabilities and may be used by all smart phoebe tablets computing and mobile device.

Typically, a user or users, which may be people or groups of users and/or other systems, may engage information technology systems (e.g., computers) to facilitate operation of the system and information processing. In turn, computers employ processors to process information and such processors may be referred to as central processing units ("CPU"). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the present invention may be connected to and/or communicate with Entities such as, but not limited to: one or more users from user input devices; peripheral devices; an optional cryptographic processor device; and/or a communications network. For example, the present invention may be connected to and/or communicate with users operating client device(s), including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s) and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The present invention may be based on computer systems that may comprise, but are not limited to, components such as: a computer systemization connected to memory.

Computer Systemization

A computer systemization may comprise a clock, central processing unit ("CPU(s)" and/or "processor(s)" (these terms are used interchangeable throughout the disclosure unless noted to the contrary)), a memory (e.g., a read only memory (ROM), a random access memory (RAM), etc.), and/or an interface bus, and most frequently, although not necessarily, are all interconnected and/or communicating through a system bus on one or more (mother)board(s) having conductive and/or otherwise transportive circuit pathways through which instructions (e.g., binary encoded signals) may travel to effect communications, operations, storage, etc. Optionally, the computer systemization may be connected to an internal power source; e.g., optionally the power source may be internal. Optionally, a cryptographic processor and/or transceivers (e.g., ICs) may be connected to the system bus. In another embodiment, the cryptographic processor and/or transceivers may be connected as either internal and/or external peripheral devices via the interface bus I/O. In turn, the transceivers may be connected to antenna(s), thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing the controller of the present invention to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the present invention and beyond through various interfaces. Should processing requirements dictate a greater amount speed and/or capacity, distributed processors (e.g., Distributed embodiments of the present invention), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the present invention may be achieved by implementing a microcontroller such as CAST's R8051XC2 microcontroller; Intel's MCS 51 (i.e., 8051 microcontroller); and/or the like. Also, to implement certain features of the various embodiments, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the component collection (distributed or otherwise) and/or features of the present invention may be implemented via the microprocessor and/or via embedded components; e.g., via ASIC, coprocessor, DSP, FPGA, and/or the like. Alternately, some implementations of the present invention may be implemented with embedded components that are configured and used to achieve a variety of features or signal processing.

Depending on the particular implementation, the embedded components may include software solutions, hardware solutions, and/or some combination of both hardware/software solutions. For example, features of the present invention discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the features of the present invention. A hierarchy of programmable interconnects allow logic blocks to be interconnected as needed by the system designer/administrator of the present invention, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the present invention may be developed on regular FPGAs and then migrated into a fixed version that more resembles ASIC implementations. Alternate or coordinating implementations may migrate features of the controller of the present invention to a final ASIC instead of or in addition to FPGAs. Depending on the implementation all of the aforementioned embedded components and microprocessors may be considered the "CPU" and/or "processor" for the present invention.

Power Source

The power source may be of any standard form for powering small electronic circuit board devices such as the following power cells: alkaline, lithium hydride, lithium ion, lithium polymer, nickel cadmium, solar cells, and/or the like. Other types of AC or DC power sources may be used as well In the case of solar cells, in one embodiment, the case provides an aperture through which the solar cell may capture photonic energy. The power cell is connected to at least one of the interconnected subsequent components of the present invention thereby providing an electric current to all subsequent components. In one example, the power source is connected to the system bus component. In an alternative embodiment, an outside power source is provided through a connection across the I/O interface. For example, a USB and/or IEEE 1394 connection carries both data and power across the connection and is therefore a suitable source of power.

Interface Adapters

Interface bus(ses) may accept, connect, and/or communicate to a number of interface adapters, conventionally although not necessarily in the form of adapter cards, such as but not limited to: input output interfaces (I/O), storage interfaces, network interfaces, and/or the like. Optionally, cryptographic processor interfaces similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces may accept, communicate, and/or connect to a number of storage devices such as, but not limited to: storage devices, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces may accept, communicate, and/or connect to a communications network. Through a communications network, the controller of the present invention is accessible through remote clients (e.g., computers with web browsers) by users. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed embodiments of the present invention), architectures may similarly be employed to pool, load balance, and/or otherwise increase the communicative bandwidth required by the controller of the present invention. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces may be used to engage with various communications network types. For example, multiple network interfaces may be employed to allow for the communication over broadcast, multicast, and/or unicast networks.

Input Output interfaces (I/O) may accept, communicate, and/or connect to user input devices, peripheral devices, cryptographic processor devices, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital. Digital Visual Interface (DVI), high-definition multimedia interface (HDMI), RCA, RF antennae, S-Video, VGA, and/or the like; wireless transceivers: 802.11a/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices often are a type of peripheral device (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices and the like may be connected and/or communicate to I/O and/or other facilities or the like such as network interfaces, storage interfaces, directly to the interface bus, system bus, the CPU, and/or the like. Peripheral devices may be external, internal and/or part of the controller of the present invention. Peripheral devices may also include, for example, an antenna, audio devices (e.g., line-in, line-out, microphone input, speakers, etc.), cameras (e.g., still, video, webcam, etc.), and/or the like.

Cryptographic units such as, but not limited to, microcontrollers, processors, interfaces, and/or devices may be attached, and/or communicate with the controller of the present invention. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory. However, memory is a fungible technology and resource, thus, any number of memory embodiments may be employed in lieu of or in concert with one another. It is to be understood that the controller of the present invention and/or a computer systemization may employ various forms of memory. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory will include ROM, RAM, and a storage device. A storage device may be any conventional computer system storage. Storage devices may include a drum; a (fixed and/or removable) magnetic disk drive; a magneto-optical drive; an optical drive (i.e., Blueray. CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory may contain a collection of program and/or database components and/or data such as, but not limited to: operating system component(s) (operating system); information server component(s) (information server); user interface component(s) (user interface); Web browser component(s) (Web browser); database(s); mail server component(s); mail client component(s); cryptographic server component(s) (cryptographic server) and/or the like (i.e., collectively a component collection). These components may be stored and accessed from the storage devices and/or from storage devices accessible through an interface bus. Although non-conventional program components such as those in the component collection, typically, are stored in a local storage device, they may also be loaded and/or stored in memory such as: peripheral devices, RAM, remote storage facilities through a communications network, ROM, various forms of memory, and/or the like.

Operating System

The operating system component is an executable program component facilitating the operation of the controller of the present invention. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millennium/NT/Vista/XP (Server), Palm OS, and/or the like. The operating system may be one specifically optimized to be run on a mobile computing device, such as iOS, Android, Windows Phone, Tizen, Symbian, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the controller of the present invention to communicate with other entities through a communications network. Various communication protocols may be used by the controller of the present invention as a subcarrier transport mechanism for interaction, such as, but not limited to: multicast, TCP/IP, UDP, unicast, and/or the like.

Information Server

An information server component is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the controller of the present invention based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port, and/or the like. An information server may communicate to and/or with other components in a component collection, including itself, and/or facilities of the like. Most frequently, the information server communicates with the database of the present invention, operating systems, other program components, user interfaces, Web browsers, and/or the like.

Access to the database of the present invention may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the present invention. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the present invention as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millennium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself; and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox. Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, User Agents, and/or the like from the enabled nodes of the present invention. The combined application may be nugatory on systems employing standard Web browsers.

Mail Server

A mail server component is a stored program component that is executed by a CPU. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the present invention.

Access to the mail of the present invention may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component is a stored program component that is executed by a CPU. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component is a stored program component that is executed by a CPU, cryptographic processor, cryptographic processor interface, cryptographic processor device, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP))

encryption and/or decryption. The cryptographic component may employ cryptographic techniques such as, but not limited to: digital certificates (e.g., X.509 authentication framework), Digital Signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5). Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the present invention may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to enable the component of the present invention to engage in secure transactions if so desired. The cryptographic component facilitates the secure accessing of resources on the present invention and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The Database of the Present Invention

The database component of the present invention may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the database of the present invention may be implemented using various standard data-structures, such as an array, hash. (linked) list, struct, structured text file (e.g., XML), table, JSON, NOSQL and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component includes several tables. A user table may include fields such as, but not limited to: user_id, ssn, dob, first_name, last_name, age, state, address_firstline, address_secondline, zipcode, devices_list, contact_info, contact_type, alt_contact_info, alt_contact_type, DID, and/or the like to refer to any type of enterable data or selections discussed herein. The user's table may support and/or track multiple Entity accounts. A Client's table may include fields such as, but not limited to: user_id, client_id, client_ip, client_type, client_model, operating_system, os_version, app_installed flag, and/or the like. An Apps table may include fields such as, but not limited to: app_ID, app_name, app_type, OS_compatibilities_list, version, timestamp, developer_ID, and/or the like.

In one embodiment, user programs may contain various user interface primitives, which may serve to update the platform of the present invention. Also, various accounts may require custom database tables depending upon the environments and the types of clients the system of the present invention may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components. The system of the present invention may be configured to keep track of various settings, inputs, and parameters via database controllers.

While this disclosure refers to exemplary embodiments, it will be understood by those skilled in the art that various changes may be made and equivalents may be substituted for elements thereof without departing from the scope of the disclosure. In addition, many modifications will be appreciated by those skilled in the art to adapt a particular instrument, situation or material to the teachings of the disclosure without departing from the spirit thereof. Therefore, it is intended that the disclosure not be limited to the particular embodiments disclosed.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements. Therefore, it is intended that the disclosure not be limited to the particular embodiments disclosed.

What is claimed:

1. A system for recharging a battery, comprising:
a memory configured to store computer-executable instructions;
a processor, communicatively coupled to the memory that facilitates execution of the computer-executable instructions;
a battery;
a thermal insulating layer, said thermal insulating layer being adapted and configured as an exterior of the battery; and
an application interface unit,
wherein said application interface unit is adapted and configured to control the plurality of solar panels,
wherein said battery is adapted and configured with the thermal insulation layer for harnessing heat created by a plurality of solar panels,
wherein the application interface unit is used to control an amount of stored heat, and
wherein said plurality of solar panels is configured on the exterior of the battery.

2. The system of claim 1, wherein said processor transforms heat energy collected by the plurality of solar panels and stored in the thermal insulation layer into energy to power a communication device.

3. The system of claim 2, wherein a user may adjust the communication device's power settings to operate on power derived from a wireless source.

4. The system of claim 3, wherein the wireless source is solar panels configured on the communication device.

5. The system of claim 1, wherein the thermal insulation layer includes thermal coils.

6. The system of claim 1, wherein the thermal insulation layer is configured on the interior of the battery.

7. The system of claim 1, wherein said application interface unit is encrypted.

8. The system of claim 1, wherein the thermal insulation layer is configured external to the battery.

9. The system of claim 1, wherein the thermal insulation layer surrounds a perimeter of the plurality of solar panels.

10. The system of claim 1, wherein the plurality of solar panels is configured to be on an exterior of a communication device.

11. The system of claim 1, wherein the battery is further powered by a micro battery adapted and configured to be an internal component of the battery.

12. The system of claim 1, wherein said battery can be adapted and configured for use in one or more electronic devices selected from the group consisting of mobile devices; desktop computers; and devices which utilize battery power.

13. The system of claim 1, wherein said plurality of solar panels are controlled by the application interface unit.

14. A method for recharging a battery; comprising:
storing computer-executable instructions on a memory; and
executing the computer-executable instructions using a processor, communicatively coupled to the memory, wherein said instructions include:
capturing solar heat power via a plurality of solar panels;
controlling the plurality of solar panels via an application interface unit; and
controlling an amount of stored heat via the application interface unit,
wherein a thermal insulating layer is adapted and configured as the exterior of the battery, and
wherein the battery is adapted and configured with the thermal insulation layer for harnessing heat created by the plurality of solar panels.

15. The method of claim 14, wherein the plurality of solar panels are configured on an exterior of the battery.

16. The method of claim 14, wherein said processor transforms heat energy collected by the plurality of solar panels and stored in a thermal insulation layer into energy to power a communication device.

* * * * *